Jan. 24, 1967 R. K. SHELBY 3,300,553
PROCESS FOR SELECTIVELY FOAMING SURFACE
AREAS ON A PLASTIC ARTICLE
Filed Oct. 28, 1964
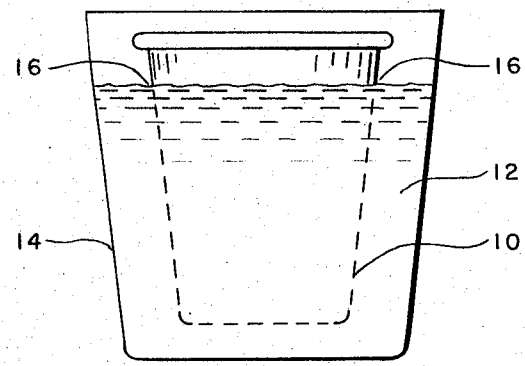
Fig. I
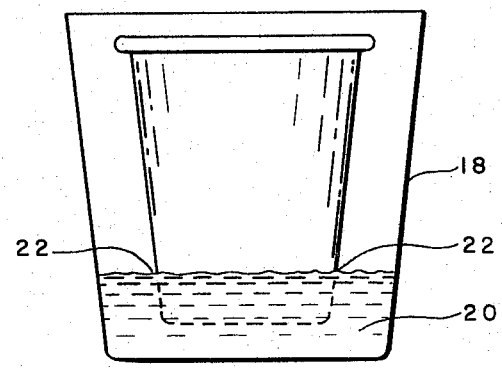
Fig. II
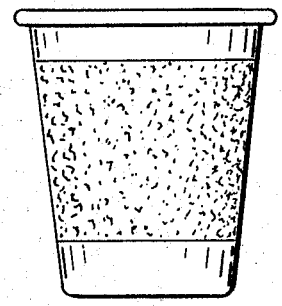
Fig. III
RICHARD K. SHELBY INVENTOR.
BY
ATTORNEY.

3,300,553
PROCESS FOR SELECTIVELY FOAMING SURFACE AREAS ON A PLASTIC ARTICLE
Richard K. Shelby, Downers Grove, Ill., assignor to Monsanto Company, St. Louis, Mo., a corporation of Delaware
Filed Oct. 28, 1964, Ser. No. 407,118
5 Claims. (Cl. 264—45)

The present invention relates to the manufacture of plastic articles and more particularly to the manufacture of plastic articles having insulating surfaces.

It is well known in the art that plastic foams can be made by incorporating a blowing agent or liberating gas material into a thermoplastic resin and subsequently raising the temperature of the resin. This causes the blowing agent to convert from a solid or liquid state to a gaseous state thereby expanding the resin to produce cellular structures. The resulting foamed resin is of a much lighter density than the original resin and generally possesses greatly increased sound dampening and heat insulating properties.

In spite of the advantages gained by foaming plastic resins, the use of these foamed materials has been limited for many purposes because of the comparatively poor structural strengths of the final fabricated articles. To minimize this problem, various methods for supporting the foamed resin have been devised, most of which involved adhering or bonding solid or rigid members to the foam. However, these structures are generally difficult and expensive to construct and are sometimes limited in their application depending on the effectiveness of the bonding operation and the difficulty of preserving the foam intact.

In a copending application Serial Number 272,540, filed April 12, 1963 now Patent No. 3,262,625, there is described the formation of plastic articles which combine the insulating characteristics of foamed resin and the structural stability and strength of non-foamed plastic. In brief, these plastic articles are produced by steeping a plastic article in a medium which is absorbable by the plastic for a predetermined interval of time, removing the plastic article from the medium and finally heating the plastic article to produce a foamed cover. In this manner, plastic articles such as containers, conduits, etc. are obtained which have good insulating and structural characteristics. Unfortunately, serious problems have been encountered when attempting to control the extent of the area or surface on the plastic article to be foamed. This is primarily due to the difficulty of controlling the area extent of medium contact with the plastic article particularly at high speed production operations.

Accordingly, it is a principal object of the present invention to partially foam predetermined surface areas on plastic articles.

Another object of the present invention is to partially foam predetermined surface areas on plastic articles at high speed production rates.

A further object of the present invention is to control the extent of the foamed surface area on plastic articles or articles which have been partially fabricated from plastic and which have been exposed to a medium which is absorbable by the plastic and subsequently heated to foam portions of the plastic surface areas exposed to the medium.

A further object of this invention is to provide method and means to attain the preceding objects.

Other objects of this invention will in part be obvious and will in part appear hereinafter.

These and other objects are attained by exposing a surface of a plastic article to a medium which is absorbable by the plastic, selectively steeping at least a part of said exposed surface in a liquid diluent having a higher boiling point temperature than the medium and subjecting said exposed surface to a temperature which is between the boiling point temperature of said medium and the boiling point temperature of said liquid diluent to produce a foam covering at the previously exposed and unsteeped areas. The medium which is absorbable by the plastic is considered to be any material which is (1) absorbable by the plastic being processed and (2) convertible to a gaseous state at a temperature below the melting point temperature of the plastic. The liquid diluent is considered to be any liquid which has a higher boiling point than the medium described above and which is substantially miscible with said medium. The plastic articles generally referred to herein include articles which are either wholly or partially fabricated from plastic.

The following drawings are provided for the purpose of illustrating various embodiments of the present invention.

FIGURE I is a side view, partly in section, illustrating a container being partially submerged in a medium which is absorbable by the plastic.

FIGURE II is a side view, illustrating the same container shown in FIGURE I being selectively steeped with a liquid diluent in accordance with the practice of this invention.

FIGURE III is a side view of the container shown in FIGURES I and II after being subsequently heated to produce a foam covering.

Referring in detail to the figures of the drawings, and more specifically FIGURE I, there is schematically shown a container 10 which is substantially submerged in a liquid 12 confined in a tank 14 up to an immersion line designated 16—16. The liquid 12 is a medium which is absorbable by the plastic and convertible to a gaseous state at a temperature below the melting point temperature of the plastic. The container 10 is maintained in this position for about 5 seconds before it is removed and transported towards and into a tank 18 shown in FIGURE II which contains a liquid diluent 20. As a result of this latter operation, the lower portion of the container is steeped in the liquid diluent 20 up to the line of immersion 22—22. After a few seconds, the container is removed from tank 18 and subjected to a heating operation which causes the surface area of the container between the immersion lines 22—22 and 16—16 to foam. In other words, it is possible to selectively foam portions of an article of manufacture by first exposing the article to a medium which is absorbable by the plastic and then selectively steeping portions of the plastic article to inhibit foaming at the steeped areas.

The above description and particularly the drawings are set forth for the purpose of illustration and not for the purpose of limitation. In the place of containers, any plastic article of manufacture which is foamable by the process described in copending application Serial Number 272,540, filed April 12, 1963, may be treated in the same manner to foam selective portions of the plastic article. In addition to the tanks shown in FIGURES I and II of the drawings, any suitable equipment may be substituted which will serve the purpose of initially exposing the plastic article to a medium which is absorbable by the plastic and subsequently partially steeping the plastic article.

In general, the plastics treated in the practice of this invention are plastic materials which have been fabricated into various shapes and include polymers such as those based on styrene, vinyl halide, vinylidene halide, vinyl acetate, cellulose acetate or butyrate, ethyl cellulose, acrylic acid esters, methacrylic acid esters, acrylonitrile, ethylene, propylene and higher olefins, isobutylene, fluoro-olefins and chlorofluoro-olefins, as well as copolymers, interpolymers, graft polymers, and chlorinated and chlorosulfonated polymers of the monomers corresponding to the above-mentioned polymeric products and mixtures of the same. A particularly useful material for forming articles such as containers is a rubber modified polystyrene or polystyrene which preferably has incorporated therein a rubber compound grafted on to the molecule.

The diluents which may be employed in the practice of this invention are liquid substances which will effectively dilute or leach the medium which has been absorbed into the plastic. These liquid substances must be the type that will not cause the plastic to foam during the subsequent heating operation. Consequently, these liquid diluents will generally have boiling points above the temperature at which the subsequent heating operation is carried out and will be miscible with the particular medium used in order to dilute or extract the medium from the plastic. Typical diluents which may find utility in the practice of this invention are ethyl acetate, isopropyl acetate, methyl-ethyl ketone, ethyl alcohol, isopropyl alcohol, and the like. Alcohols (preferably alcohols having less than 7 carbon atoms) are particularly suitable when Freon, e.g., trichlorofluoromethane, is used as the medium. Other suitable diluents might include butyl alcohol, amyl alcohol, hexyl alcohol, ethyl butyl alcohol; amines, for example, n-butyl amine, amylamine, triethylamine, monoethanolamine, etc.; esters such as diethyl carbonate, glycol diformate, ethyl acetate, methyl lactate, etc.; ethers, such as isopropyl ether, butyl ether, dioxolane, dioxane, ethylene glycol, monomethyl ether, etc.; furanes such as furfural, furfuryl alcohol, etc.; glycols, such as ethylene glycol, propylene glycol, butylene glycol; halogenated compounds, such as butyl chloride, amyl chlorides, ethylene dichloride, etc.; hydrocarbons, such as n-pentane, n-hexane, cyclohexanone, benzene, toluene, xylene, etc.; ketones, such as acetone, methyl-ethyl ketone, mesityl oxide, cyclohexanone; nitriles, such as acetonitrile; nitrocarbons, such as nitromethane, nitroethane, and the like. In the case of some plastics, water can be used. The choice of the particular diluent will, of course, depend on its extraction or diluting efficiently with the particular medium being employed.

The medium which is absorbable by the plastic is considered to be any material which is (1) absorbable by the plastic being processed and (2) convertible to a gaseous state at a temperature below the melting point temperature of the plastic. Preferably, the medium will contain or be a solvent for the plastic and may possibly include a non-solvent to slow the rate of absorption and/or partial solution of the plastic. For the sake of clarification, the term "solvent" also includes those materials in which the plastic is considered slightly soluble. The intent in the choice of the medium is to utilize materials which after exposure to the plastic will cause the plastic to partially foam on the subsequent application of heat.

The choice of the medium which may be employed will depend primarily on the type of plastic material which is to be steeped. For example, acetone or methyl ethyl ketone is considered quite suitable for the acrylonitrile-butadiene-styrene copolymers while Freon (trichlorofluoromethane) is less desirable. On the other hand, Freon is considered quite suitable for polystyrene homopolymers and rubber modified interpolymers. Among the solvents which find application in the present process there may be listed Freon (trichlorofluoromethane), methylene chloride, acetone, dichloroethylene, xylene, carbon tetrachloride, methyl ethyl ketone, benzol, toluol, chloroform and the like. Among the materials which sometimes find utility as nonsolvents or solvents depending on the type of plastic, there may be included methanol, ethanol, n-pentane, isopentane, hexane, diethylethene and the like.

The exposure of the plastic to the medium generally requires only a few seconds for maximum absorption depending for the most part on the depth of foam desired, the type of medium used, and the respective temperatures of the medium and plastic article. This operation may be carried out by any suitable method such as immersion of the plastic article in a liquid medium or even by subjecting the plastic article to solvent vapors in a vessel which may or may not be pressurized.

With regard to the diluent steeping operation, the time period of steeping is generally dependent on the type of medium utilized and the length of exposure to the medium. In general, the optimum steeping length of time for diluting and/or extracting the medium from the plastic can be readily determined by simple experimentation. The time balance should be such to produce little or no foaming at the area contracted by both the medium and the diluent. For the most part, the optimum time the plastic material must be exposed to the medium will be determined first since this step has a substantial effect on the foam covering produced. In addition, the length of time between exposure to the medium and the steeping operation should be kept to a minimum for optimum results.

In general, the plastic article is permitted to dry for a short interval of time between exposure to the medium step and the subsequent heating operation. This drying interval allows deeper diffusion and serves to increase the number of cells and decrease their size. This is considered important for good insulating properties. If desired, the drying interval may be accelerated by forced air drafts, moderate heating conditions, etc. Since the steeping step is also carried out between the time of exposure to the medium and the heating operation, it is generally preferred that the plastic article be steeped as soon as possible after exposure to the medium so as not to overdry the plastic while still permitting sufficient time to permit the diluent to dilute or leach the medium from designated surface areas of the plastic.

After the drying interval, the plastic article is heated in accordance with the practice of this invention to foam portions of the plastic article at designated areas. The heating means utilized may vary, the final results being affected by the uniformity of heating, rate of heating and temperature level at which it is conducted. The temperature level will, of course, be above the temperature at which the medium converts from a solid or liquid state to a gaseous state. Consequently, any of the three fundamental types of heat transfer, i.e., conduction, convection, and radiation may be utilized. For ease of handling, methods depending on convection are generally preferred, that is, the use of a preheated fluid or more preferably a preheated gas circulating within, around or adjacent the plastic article resulting in a heat transfer from the gas to the plastic. In the case of biaxially oriented plastic, it is sometimes desirable to support or fix the sheet dimensionally during the heating operation to avoid loss of orientation.

The following example is given to illustrate the invention and is not intended as a limitation thereof. Unless otherwise specified, quantities are mentioned on a weight basis.

EXAMPLE I

Styrene homopolymer having a Staudinger molecular weight of approximately 55,000 is injection molded in the form of a smooth, tapered cup which is approximately four inches in height with an average inside cup diameter of two and one-quarter inches.

The cup formed by the above-described operation is immersed in a solvent composed of Freon (trichlorofluoromethane) up to within one-half of its top peripheral edge. After a ten second interval, the cup is withdrawn from the Freon and allowed to dry for five seconds at room temperature conditions. The lower one-half inch of the cup is then dipped in isopropyl alcohol for a 20 second interval. After the cup is withdrawn from the coating substance, it is exposed to dry room temperature conditions for 20 seconds and then heated by 80° C. air for a period of ten seconds.

The resulting cup has a foamed outer surface throughout the area of solvent immersion except at the area steeped with isopropyl alcohol extending into the body of the cup approximately a third of its overall thickness. Further examination of the cup discloses that the overall structural properties of the cup are not seriously altered by the above-described process while at the same time the insulating properties of the cup are increased several fold.

The products of this invention are formed from plastic materials. The structures which may be fabricated in the practice of this invention are exceptionally useful for applications requiring high insulating characteristics at defined areas and good structural properties. The products formed in the practice of this invention can be most advantageously used in dispensing or vending applications which require stacking arrangements. Where nested containers are dispensed individually from a stack, it is extremely important that the foamed portion of one cup not contact an adjacent cup if proper dispensing or stack release is to be obtained. Consequently, if a partially foamed insulating cup is employed in nested relationship for vending purposes, the area of cup surface foamed must be rigidly controlled.

It is obvious that many variations may be made in the products and processes set forth above without departing from the spirit and scope of this invention.

What is claimed is:

1. The process for selectively foaming predetermined surface areas on a plastic article which comprises exposing a surface of a plastic article to a medium which is absorbable by the plastic, selectively steeping at least a part of said exposed surface in a liquid diluent having a higher boiling point temperature than the medium and subjecting said exposed surface to a temperature which is between the boiling point temperature of said medium and the boiling point temperature of said liquid diluent.

2. The process according to claim 1 wherein the medium is (1) absorbable by the plastic article and (2) convertible to a gaseous state at a temperature below the melting point temperature of the plastic used to form the article.

3. The process according to claim 2 wherein the medium is a solvent for the plastic.

4. The process for selectively foaming predetermined surface areas on a rubber modified polystyrene structure which comprises exposing a surface of said structure to a chlorofluoromethane solvent, selectively steeping at least a part of said exposed surface with alcohol and finally subjecting said exposed surface to a temperature which is between the boiling point of said chlorofluoromethane solvent and said alcohol.

5. The process for selectively foaming predetermined surface areas on a plastic container which comprises exposing a portion of the outer surface of said container to a medium which is absorbable by the plastic, selectively steeping at least a part of said exposed surface with a liquid diluent having a higher boiling point than the medium and finally subjecting said exposed surface to a temperature which is between the boiling point of said medium and the boiling point of said liquid diluent.

References Cited by the Examiner
UNITED STATES PATENTS

| | | | |
|---|---|---|---|
| 2,825,282 | 3/1958 | Gergen et al. | 264—52 X |
| 2,964,799 | 12/1960 | Roggi et al. | 264—167 X |
| 3,042,972 | 7/1962 | Lafferty | 264—53 |
| 3,262,625 | 7/1966 | Russell et al. | 264—45 X |

ALEXANDER H. BRODMERKEL, *Primary Examiner.*

P. E. ANDERSON, *Assistant Examiner.*